US012718592B2

(12) United States Patent
Shimamura

(10) Patent No.: US 12,718,592 B2
(45) Date of Patent: Aug. 25, 2026

(54) INFORMATION COLLECTION SYSTEM, SERVER, AND INFORMATION COLLECTION METHOD

(71) Applicant: NEC Corporation, Tokyo (JP)

(72) Inventor: Shohei Shimamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 18/037,290

(22) PCT Filed: Nov. 27, 2020

(86) PCT No.: PCT/JP2020/044197
§ 371 (c)(1),
(2) Date: May 16, 2023

(87) PCT Pub. No.: WO2022/113261
PCT Pub. Date: Jun. 2, 2022

(65) Prior Publication Data

US 2024/0005672 A1 Jan. 4, 2024

(51) Int. Cl.
*G06V 20/56* (2022.01)
*G06V 10/82* (2022.01)
*G07C 5/00* (2006.01)

(52) U.S. Cl.
CPC ............ *G06V 20/588* (2022.01); *G06V 10/82* (2022.01); *G07C 5/008* (2013.01)

(58) Field of Classification Search
CPC ...... G06V 20/588; G06V 10/82; G06V 20/56; G07C 5/008; G08G 1/01; G08G 1/09; G08G 1/16; G16Y 10/40
See application file for complete search history.

(56) References Cited

U.S. PATENT DOCUMENTS

| | | | | |
|---|---|---|---|---|
| 2017/0200061 | A1* | 7/2017 | Julian | G08G 1/04 |
| 2018/0158323 | A1* | 6/2018 | Takenaka | G06V 20/46 |
| 2019/0220675 | A1* | 7/2019 | Guo | G06F 18/2113 |
| 2019/0265712 | A1 | 8/2019 | Satzoda et al. | |

(Continued)

FOREIGN PATENT DOCUMENTS

| | | |
|---|---|---|
| JP | 2018-136754 A | 8/2018 |
| JP | 2020-003934 A | 1/2020 |
| JP | 2020-038409 A | 3/2020 |

OTHER PUBLICATIONS

JP Office Action for JP Application No. 2022-564926, mailed on Nov. 5, 2024.

(Continued)

*Primary Examiner* — Solomon G Bezuayehu
(74) *Attorney, Agent, or Firm* — Sughrue Mion, PLLC

(57) ABSTRACT

A recognition model selection means selects a recognition model for identifying that a vehicle is in a situation corresponding to a specific scene on the basis of sensor information. A transmission means transmits the selected recognition model to a vehicle. A scene determination means determines whether or not the vehicle is in a situation corresponding to a specific scene on the basis of the recognition model received from a server and sensor information. A data transmission means transmits information to the server in a case where the vehicle is determined to be in a situation corresponding to a specific scene. A data collection means collects information transmitted from the vehicle.

17 Claims, 9 Drawing Sheets

(56) References Cited

U.S. PATENT DOCUMENTS

| | | | | |
|---|---|---|---|---|
| 2019/0303718 | A1* | 10/2019 | Tanigawa | G08G 1/166 |
| 2019/0392231 | A1* | 12/2019 | Dean | G06F 40/20 |
| 2020/0074218 | A1* | 3/2020 | Godhantaraman | G06V 20/46 |
| 2020/0074990 | A1* | 3/2020 | Kim | G10L 15/16 |
| 2020/0132011 | A1* | 4/2020 | Kitagawa | G06N 3/084 |
| 2020/0364471 | A1* | 11/2020 | Park | G06V 40/10 |
| 2021/0390353 | A1* | 12/2021 | Futatsugi | G06V 10/87 |
| 2023/0086088 | A1* | 3/2023 | Ogishima | G06N 3/098 340/905 |

OTHER PUBLICATIONS

International Search Report for PCT Application No. PCT/JP2020/044197, mailed on Feb. 2, 2021.

* cited by examiner

INFORMATION COLLECTION SYSTEM, SERVER, AND INFORMATION COLLECTION METHOD

This application is a National Stage Entry of PCT/JP2020/044197 filed on Nov. 27, 2020, the contents of all of which are incorporated herein by reference, in their entirety.

TECHNICAL FIELD

The present disclosure relates to an information collection system, a server, a vehicle, an information collection method, an information transmission method, and a computer readable medium.

BACKGROUND ART

Connected cars equipped with communication apparatuses and capable of communicating with external servers and the like are becoming increasingly popular. As a related art, Patent Literature 1 discloses a data collection system that collects road information from in-vehicle apparatuses installed in vehicles. The in-vehicle apparatus described in Patent Literature 1 is connected to various sensors of a vehicle, and detects abnormalities based on signals input from the various sensors. In a case where the in-vehicle apparatus detects an abnormality, it generates conditions for collecting data related to the detected abnormality. The collection conditions include target vehicle conditions, recording triggers, and collection details.

The in-vehicle apparatus transmits the generated collection conditions and the data collection request satisfying the collection conditions to the data collection apparatus. When the data collection apparatus accepts a data collection request, it collects data based on the received collection conditions. In the data collection, the data collection apparatus transmits a collection condition file including the collection conditions generated by the in-vehicle apparatus that has transmitted the data collection request to the in-vehicle apparatus in each vehicle. The in-vehicle apparatus in each vehicle transmits data satisfying the collection conditions to the data collection apparatus.

CITATION LIST

Patent Literature

Patent Literature 1: Japanese Unexamined Patent Application Publication No. 2020-38409

SUMMARY OF INVENTION

Technical Problem

In Patent Literature 1, the data collection apparatus collects data that meets the collection conditions. Therefore, the data can be collected more efficiently than collecting all data from the in-vehicle apparatus. However, in Patent Literature 1, the in-vehicle apparatus transmits a data collection request triggered by a condition such as the sensor value exceeding a threshold value. Therefore, the data collection apparatus cannot collect data when the vehicle is in a situation corresponding to a specific scene.

In view of the above circumstances, an object of the present disclosure is to provide an information collection system, a server, a vehicle, an information collection method, an information transmission method, and a computer readable medium that can cause a server to collect data when the vehicle is in a situation corresponding to a specific scene.

Solution to Problem

In order to achieve the above object, the present disclosure provides, as a first aspect, an information collection system. The information collection system includes a server and a vehicle connected to the server via a network. In the information collection system, the server includes: a recognition model selection means for selecting a recognition model for identifying that the vehicle is in a situation corresponding to a specific scene on the basis of sensor information; a transmission means for transmitting the recognition model to the vehicle; and a data collection means for collecting information transmitted from the vehicle. The vehicle includes: a scene determination means for determining whether or not the vehicle is in a situation corresponding to a specific scene on the basis of a recognition model received from the server, and sensor information; and a data transmission means for transmitting information to the server when the vehicle is determined to be in a situation corresponding to a specific scene.

The present disclosure provides, a server as a second aspect. The server includes: a recognition model selection means for selecting a recognition model for identifying that a vehicle is in a situation corresponding to a specific scene on the basis of sensor information; a transmission means for transmitting the recognition model to the vehicle via a network; and a data collection means for collecting information from the vehicle when the vehicle is determined to be in a situation corresponding to a specific scene on the basis of the recognition model and sensor information in the vehicle.

The present disclosure provides a vehicle as a third aspect. The vehicle includes: a scene determination means for determining whether the vehicle is in a situation corresponding to a specific scene on the basis of a recognition model for identifying that the vehicle is in a situation corresponding to a specific scene on the basis of sensor information received from a server via a network, and sensor information; and a data transmission means for transmitting information to the server via a network when the vehicle is determined to be in a situation corresponding to a specific scene.

The present disclosure provides an information collection method as a fourth aspect. An information collection method includes: selecting a recognition model for identifying that a vehicle is in a situation corresponding to a specific scene on the basis of sensor information; transmitting the recognition model to the vehicle via a network; and collecting information from the vehicle when it is determined that the vehicle is in a situation corresponding to a specific scene on the basis of the recognition model and sensor information in the vehicle.

The present disclosure provides an information transmission method as a fifth aspect. An information transmission method includes: determining whether or not the vehicle is in a situation corresponding to a specific scene on the basis of a recognition model for identifying that the vehicle is in a situation corresponding to a specific scene on the basis of sensor information, which has been received from a server via a network, and sensor information; and transmitting information to the server via a network when the vehicle is determined to be in a situation corresponding to a specific scene.

The present disclosure provides a computer readable medium as a sixth aspect. The computer readable medium stores a program to cause a computer execute: selecting a recognition model for identifying that a vehicle is in a situation corresponding to a specific scene on the basis of sensor information; transmitting the recognition model to the vehicle via a network; and collecting information from the vehicle when the vehicle is determined to be in a situation corresponding to a specific scene on the basis of the recognition model and sensor information in the vehicle.

The present disclosure provides a computer readable medium as a seventh aspect. The computer readable medium stores a program to cause a processor to execute: determining whether or not a vehicle is in a situation corresponding to a specific scene on the basis of a recognition model for identifying that the vehicle is in a situation corresponding to a specific scene on the basis of sensor information, which has been received from a server via a network, and sensor information; and transmitting information to the server via a network when the vehicle is determined to be in a situation corresponding to a specific scene.

Advantageous Effects of Invention

The information collection system, server, vehicle, information collection method, information transmission method, and computer readable medium according to the present disclosure can cause a server to collect data when the vehicle is in a situation corresponding to a specific scene.

EXAMPLE EMBODIMENT

Figure 1:
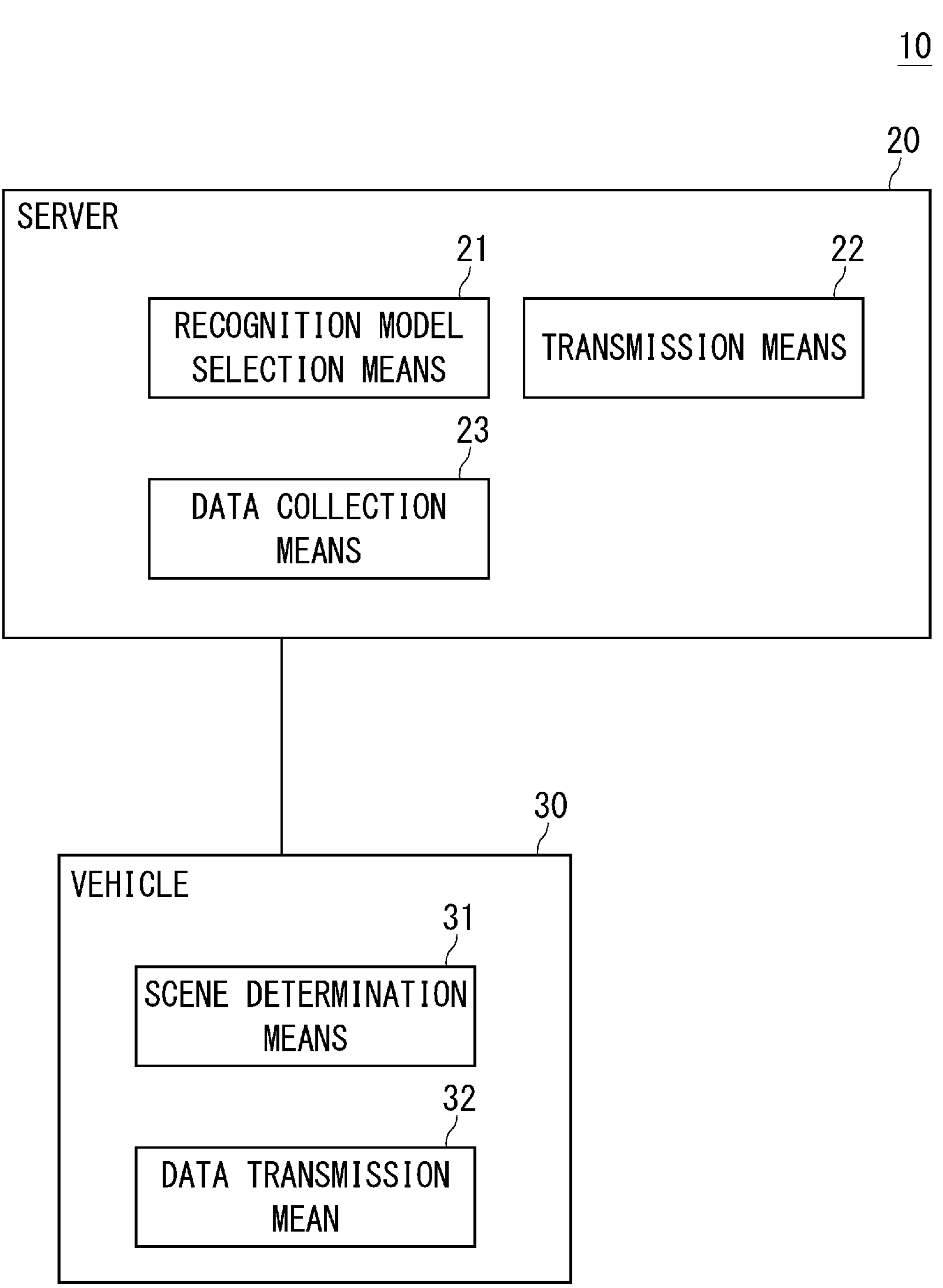
FIG. 1 is a schematic block diagram illustrating an information collection system according to the present disclosure.

Prior to describing an example embodiment according to the present disclosure, an outline of the present disclosure will be described. FIG. 1 schematically illustrates an information collection system according to the present disclosure. The information collection system 10 includes a server 20 and a vehicle 30. In the information collection system 10, the server 20 and the vehicle 30 are connected to each other via a network. The server 20 includes a recognition model selection means 21, a transmission means 22, and a data collection means 23. The vehicle 30 includes a scene determination means 31 and a data transmission means 32.

A recognition model selection means 21 of the server 20 selects a recognition model for identifying that a vehicle is in a situation corresponding to a specific scene on the basis of sensor information. The transmission means 22 transmits the recognition model selected by the recognition model selection means 21 to the vehicle 30.

The scene determination means 31 of the vehicle 30 determines whether or not the vehicle 30 is in a situation corresponding to a specific scene on the basis of the recognition model received from the server 20 and the sensor information. A data transmission means 32 transmits information to the server 20 in a case where the vehicle 30 is determined to be in a situation corresponding to a specific scene. The data collection means 23 of the server 20 collects information transmitted from the vehicle 30.

In the present disclosure, the server 20 transmits the recognition model to the vehicle 30. The vehicle 30 determines whether or not the vehicle is in a situation corresponding to a specific scene on the basis of the received recognition model and the sensor information. In a case where the vehicle 30 is determined to be in a situation corresponding to a specific scene, the vehicle transmits information to the server 20. In the present disclosure, the server 20 can designate a scene for causing the vehicle 30 to transmit information through the recognition model to be transmitted to the vehicle 30. Accordingly, the server 20 can collect data in a case where the vehicle 30 is in a situation corresponding to a specific scene.

Figure 2:
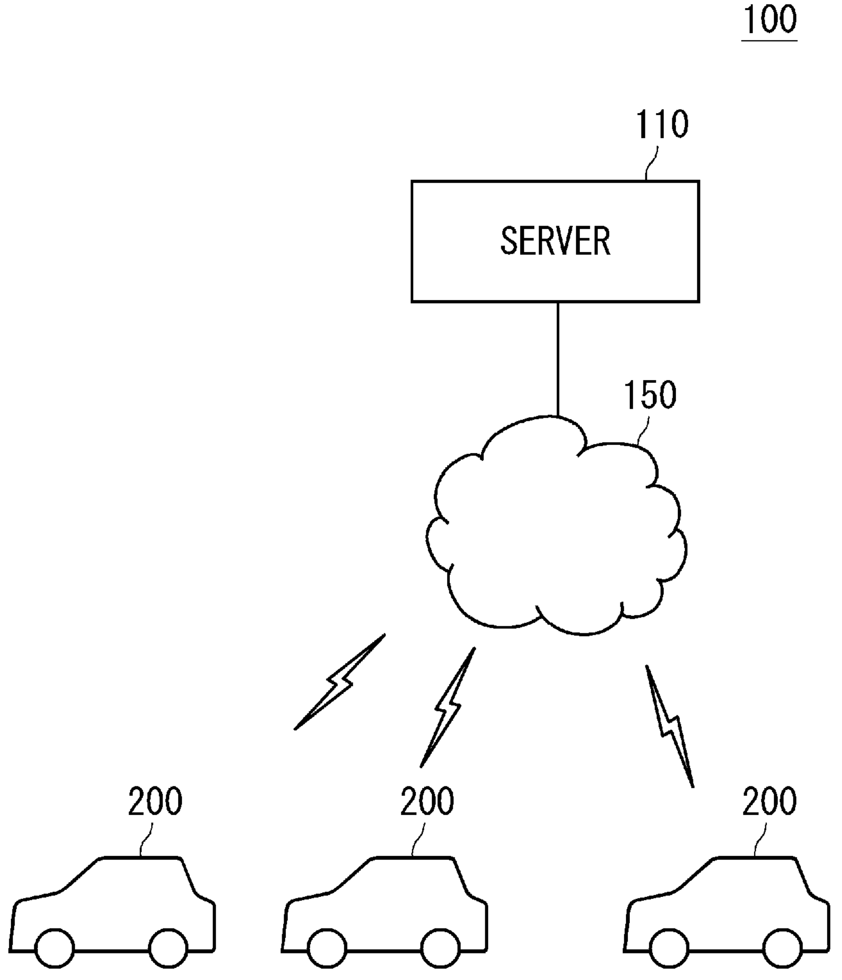
FIG. 2 is a block diagram illustrating a data collection system according to a first example embodiment of the present disclosure.

Hereinafter, example embodiments according to the present disclosure will be described in detail. FIG. 2 illustrates a data collection system according to a first example embodiment of the present disclosure. The data collection system 100 includes a server 110 and one or more vehicles 200. In the data collection system 100, the server 110 is connected to the vehicle 200 via a network 150. The network 150 includes, for example, a wireless communication network using a communication line standard such as long term evolution (LTE). The network 150 may include a wireless communication network, such as WiFi (registered trademark) or the 5th generation mobile communication system. The data collection system 100 corresponds to the information collection system 10 illustrated in FIG. 1. The server 110 corresponds to the server 20 illustrated in FIG. 1. The vehicle 200 corresponds to the vehicle 30 illustrated in FIG. 1.

Figure 3:
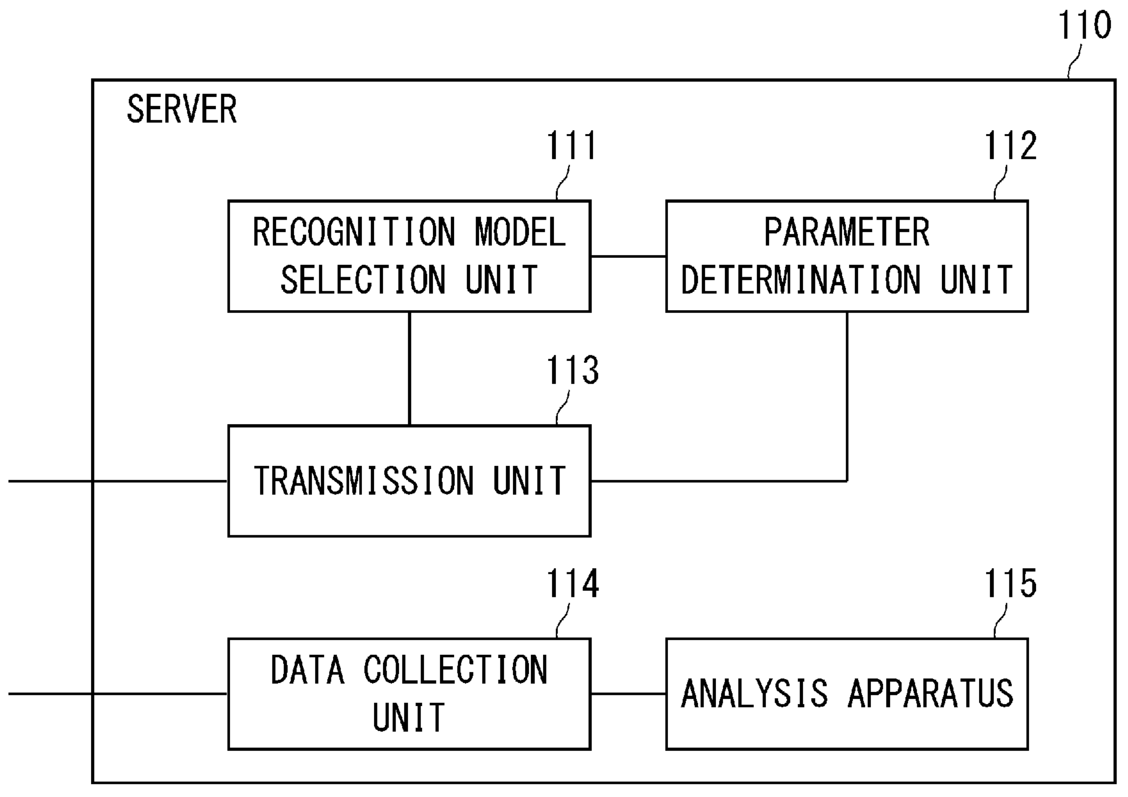
FIG. 3 is a block diagram illustrating an example of a configuration of a server.

FIG. 3 illustrates an example of a configuration of the server 110. The server 110 includes a recognition model selection unit 111, a parameter determination unit 112, a transmission unit 113, a data collection unit 114, and an analysis apparatus 115. The server 110 is disposed in, for example, a connected service infrastructure.

The recognition model selection unit 111 selects a recognition model for identifying that a vehicle is in a situation corresponding to a specific scene on the basis of the sensor information. The recognition model includes, for example, at least one of a recognition model for determining the scene of a tailgating, a recognition model for determining the scene of ignoring a traffic light, and a recognition model for determining the scene of drowsy driving. The recognition model is configured as, for example, an artificial intelligence (AI) model. The recognition model includes, for example, a convolutional neural network (CNN).

The recognition model selection unit 111 selects a recognition model to be transmitted to the vehicle 200 on the basis of, for example, the position information of the vehicle 200. The recognition model selection unit 111 selects a recognition mode using, for example, regional characteristic information in which a geographical position and a specific scene are associated with each other.

The regional characteristic information stores, for example, information indicating a specific scene to be recognized for each section separated by a mesh-like pattern at predetermined distances. The recognition model selection unit 111 acquires information indicating a specific scene associated with the position of the vehicle 200 from the regional characteristic information. The recognition model selection unit 111 selects a recognition model for identifying a specific scene indicated by the acquired information as a recognition model to be transmitted to the vehicle 200.

The recognition model selection unit 111 may select a recognition model according to the type of road on which the vehicle 200 is traveling. The type of road includes, for example, highways and other freeways, arterial roads, urban roads, and suburban roads. The recognition model selection unit 111 may select a rear-end collision scene discrimination model, for example, in a case where the vehicle 200 is traveling on a road that is continuously single road with no intersections, such as a highway.

Alternatively, the recognition model selection unit 111 may select a recognition model according to a route (route name) on which the vehicle is traveling, such as National Route 1 or Prefectural Route 55. Furthermore, the recognition model selection unit 111 may select a recognition model according to the combination of the region, such as the prefecture in which the vehicle 200 is traveling, the road type, or the name of the route. The recognition model selection unit 111 may select the recognition model designated by an operator as the recognition model to be transmitted to the vehicle 200.

The recognition model selection unit 111 may select a recognition model for each vehicle. For example, the recognition model selection unit 111 can select different recognition models for one vehicle 200 and another vehicle 200. The recognition model selection unit 111 may select a plurality of recognition models for one vehicle 200 as the recognition models to be transmitted to the vehicle 200. For example, the recognition model selection unit 111 may selects a recognition model for determining the scene of a tailgating and a recognition model for determining the scene of drowsy driving as recognition models to be transmitted to one vehicle 200. The recognition model selection unit 111 corresponds to the recognition model selection means 21 illustrated in FIG. 1.

The parameter determination unit (parameter determination means) 112 determines a parameter that specifies information to be acquired from the vehicle 200 on the basis of the recognition model selected by the recognition model selection unit 111. The parameter determination unit 112 holds, for example, a table in which an identification model, or a situation identified using the identification model, is associated with the type of information to be acquired. The parameter determination unit 112 refers to the table and determines a parameter according to the selected recognition model.

The transmission unit 113 transmits the recognition model selected by the recognition model selection unit 111 to the vehicle 200. The transmission unit 113 also transmits a parameter sheet describing the parameters (type of information) determined by the parameter determination unit 112 to the vehicle 200. The transmission unit 113 arranges the recognition model and the parameter sheet in the vehicle 200 using, for example, over the air (OTA) technology. The transmission unit 113 corresponds to the transmission means 22 illustrated in FIG. 1.

A data collection unit 114 collects information, which has been transmitted from each vehicle 200, from each vehicle 200. The data collection unit 114 corresponds to the data collection means 23 illustrated in FIG. 1. The analysis apparatus 115 executes analysis using the information collected by the data collection unit 114. For example, the analysis apparatus 115 executes analysis using information collected from the vehicle 200 for each situation identified using the recognition model. The analysis apparatus 115 is not necessarily configured inside the server 110, and may be configured as a physically different apparatus from the server 110.

Figure 4:
FIG. 4 is a block diagram illustrating an example of a configuration of a vehicle.
Figure 4:
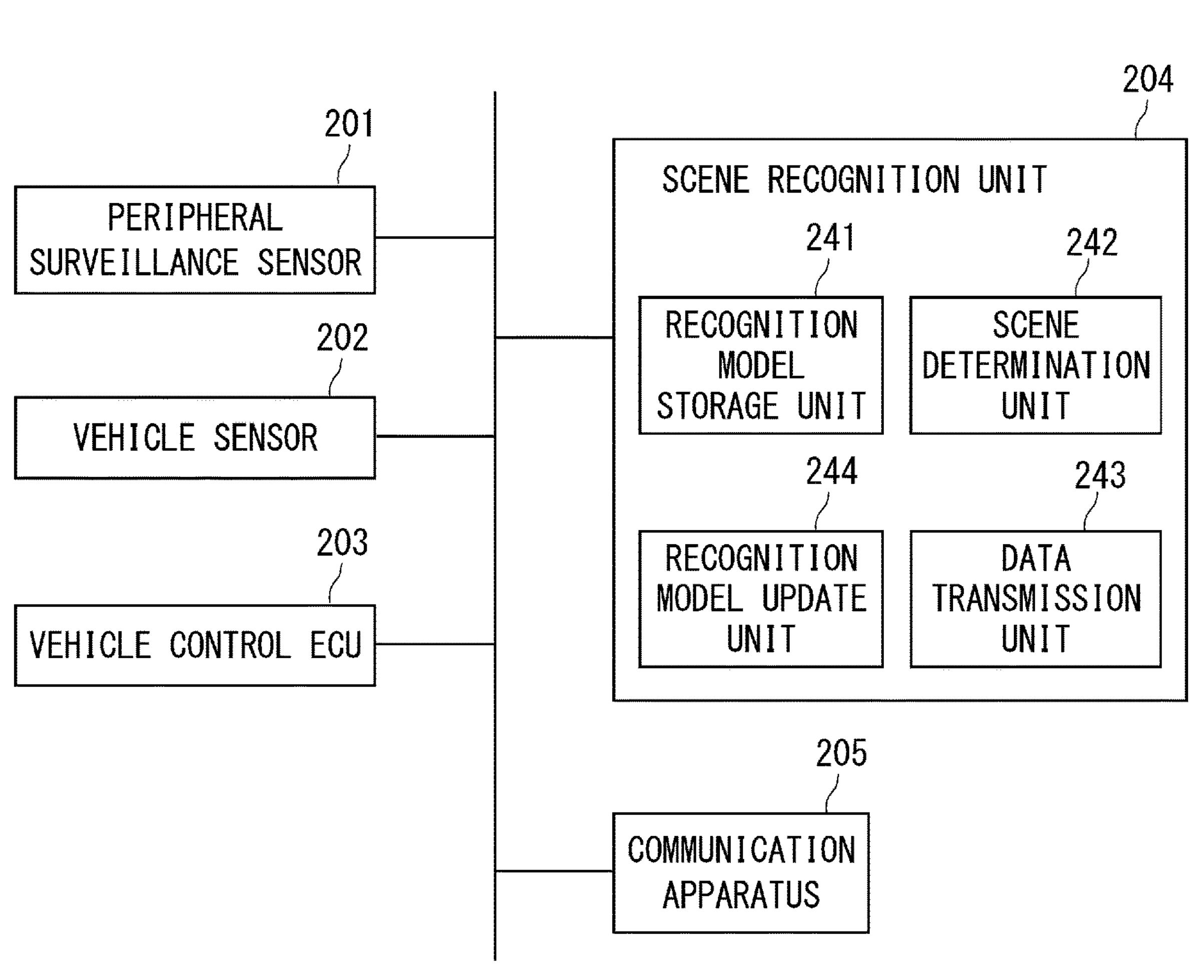

FIG. 4 illustrates an example of a configuration of the vehicle 200. The vehicle 200 includes a peripheral surveillance sensor 201, a vehicle sensor 202, a vehicle control electric control unit (ECU) 203, a scene recognition unit 204, and a communication apparatus 205. In the vehicle 200, these components are configured to be mutually communicable via an in-vehicle local area network (LAN) or a controller area network (CAN).

The peripheral surveillance sensor 201 is a sensor that monitors the peripheral situation of the vehicle 200. The peripheral surveillance sensor 201, for example, includes a camera, a radar, and a light detection and ranging (LiDAR). The peripheral surveillance sensor 201 may, for example, include a plurality of cameras to capture images of the front, rear, right, and left sides of the vehicle. The peripheral surveillance sensor 201 may include a camera that captures an image of the inside of the vehicle 200.

The vehicle sensor 202 is a sensor for detecting various states of the vehicle 200. The vehicle sensor 202 includes sensors such as a vehicle speed sensor that detects vehicle speed, a steering sensor that detects a steering angle, an accelerator position sensor that detects the opening degree of an accelerator pedal, and a brake effort sensor that detects an amount of depression of a brake pedal, and the like.

The vehicle control ECU 203 is an electronic control apparatus that controls traveling and others of the vehicle 200. In general, the electronic control apparatus includes a processor, a memory, an input/output (I/O), and a bus that connects them. On the basis of sensor information output by the vehicle sensor 202, the vehicle control ECU 203 executes various controls, such as controlling the fuel injection amount, the engine ignition timing, and the power steering assist amount.

The communication apparatus 205 is configured as an apparatus that provides radio communication between the vehicle 200 and the network 150 (see FIG. 2). The communication apparatus 205 includes a wireless communication antenna, a transmitter, and a receiver.

The scene recognition unit 204 is a functional unit that transmits information specified by the parameter sheet to the server 110 in a case where the vehicle 200 is in a situation corresponding to a specific scene identified using the recognition model. The scene recognition unit 204 receives the recognition model and the parameter sheet from the server 20 through the communication apparatus 205. Furthermore, the scene recognition unit 204 transmits information (data) designated by the parameter sheet to the server 20 through the communication apparatus 205.

The scene recognition unit 204 includes a recognition model storage unit 241, a scene determination unit 242, a data transmission unit 243, and a recognition model update unit 244. The recognition model storage unit 241 stores one or more recognition models received from the server 110. The scene determination unit 242 acquires the recognition model from the recognition model storage unit 241. The scene determination unit 242 also acquires sensor information from the peripheral surveillance sensor 201 and the vehicle sensor 202. The scene determination unit 242 determines whether or not the vehicle 200 is in a situation corresponding to a specific scene on the basis of the recognition model and the sensor information.

The scene determination unit 242 acquires, for example, information acquired using at least one of a camera included in the peripheral surveillance sensor 201, and a speed sensor and an acceleration sensor included in the vehicle sensor 202 as sensor information. The scene determination unit 242 inputs the sensor information to the CNN constituting the recognition model, for example. The recognition model outputs a determination result indicating whether or not the vehicle is in a situation corresponding to a specific scene. In a case where the determination result indicates that the vehicle is in a situation corresponding to a specific scene, the scene determination unit 242 notifies the data transmission unit 243 of the fact. The scene determination unit 242 corresponds to the scene determination means 31 illustrated in FIG. 1.

In a case where the scene determination unit 242 determines that the vehicle is in a situation corresponding to a specific scene, the data transmission unit 243 transmits the data specified in the parameter sheet to the server 110. The data transmission unit 243 transmits the data specified in the parameter sheet, for example, among the data that can be acquired from the peripheral surveillance sensor 201, the vehicle sensor 202, and the vehicle control ECU 203, to the server 110. For example, in a case where a video outside the vehicle is specified in the parameter sheet, the data transmission unit 243 transmits the video from the camera included in the peripheral surveillance sensor 201 to the server 110. In a case where the scene determination unit 242 determines that the vehicle is not in a situation corresponding to a specific scene, the data transmission unit 243 does not transmit the data specified in the parameter sheet. The data transmission unit 243 may always transmit specific information such as vehicle position information to the server 110.

The data transmission unit 243 acquires the data specified in the parameter sheet from the peripheral surveillance sensor 201, vehicle sensor 202, and a vehicle control ECU 203, regardless of the determination result of the scene determination unit 242, for example. In a case where the scene determination unit 242 determines that the vehicle is in a situation corresponding to a specific scene, the data transmission unit 243 transmits the acquired data to the server 110. In a case where the scene determination unit 242 determines that the vehicle is not in a situation corresponding to a specific scene, the data transmission unit 243 discards the acquired data. The data transmission unit 243 corresponds to the data transmission means 32 illustrated in FIG. 1.

In the present example embodiment, transmission of the parameter sheet from the server 110 to the vehicle 200 may be omitted. In such a case, the data transmission unit 243 may transmit predetermined information to the server 110, for example. For example, in the data transmission unit 243, the recognition model is associated with information to be transmitted when the recognition model is used. The data transmission unit 243 may transmit information corresponding to the recognition model used in the scene determination unit 242 to the server 110.

The recognition model update unit (recognition model update means) 244 receives the recognition model from the server 110. In a case where the recognition model update unit 244 receives the recognition model from the server 110, it stores the received recognition model in the recognition model storage unit 241. In a case where the recognition model storage unit 241 already stores the recognition model, the recognition model update unit 244 may update the recognition model stored in the recognition model storage unit 241 with the recognition model received from the server 110. In a case where the recognition model stored in the recognition model storage unit 241 is updated, the scene determination unit 242 uses the updated recognition model to determine whether or not the vehicle is in a situation corresponding to a specific scene.

Figure 5:
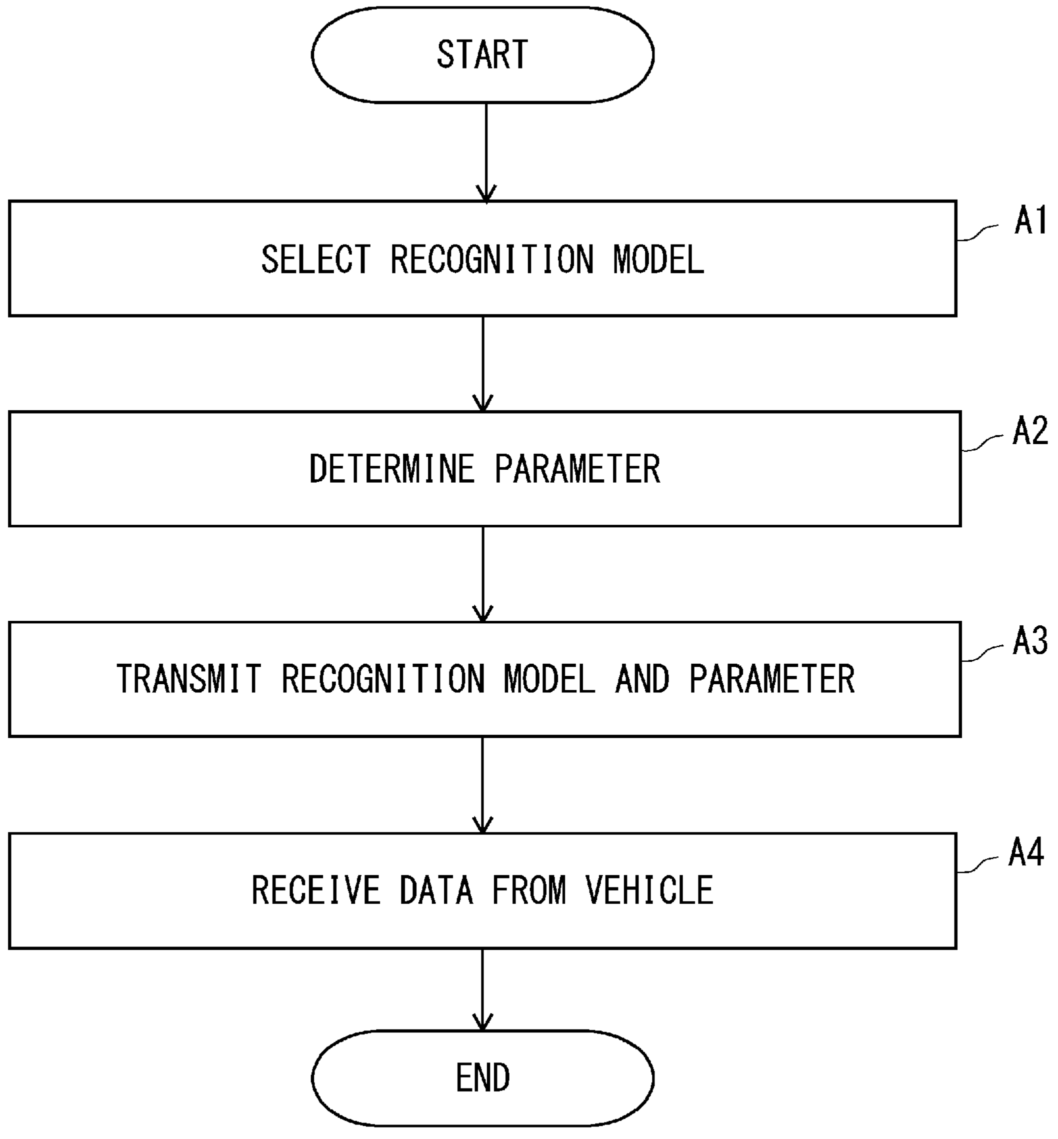
FIG. 5 is a flowchart illustrating an operation procedure in a server.

Next, an operation procedure in the data collection system will be described. FIG. 5 illustrates an operation procedure (information collection method) in the server 110. The recognition model selection unit 111 (see FIG. 3) of the server 110 selects a recognition model to be transmitted to the vehicle 200 (step A1). In step A1, the recognition model selection unit 111 selects, for example, a scene to be recognized in the vehicle 200 on the basis of the position information of the vehicle 200, and selects a recognition model corresponding to the selected scene.

The parameter determination unit 112 determines a parameter corresponding to the recognition model determined in step A1 as a parameter to be transmitted to the vehicle 200 (step A2). The transmission unit 113 transmits the recognition model selected in step A1 and the parameter sheet in which the parameter determined in step A2 is described to the vehicle 200 via the network 150 (see FIG. 2) (step A3).

Figure 6:
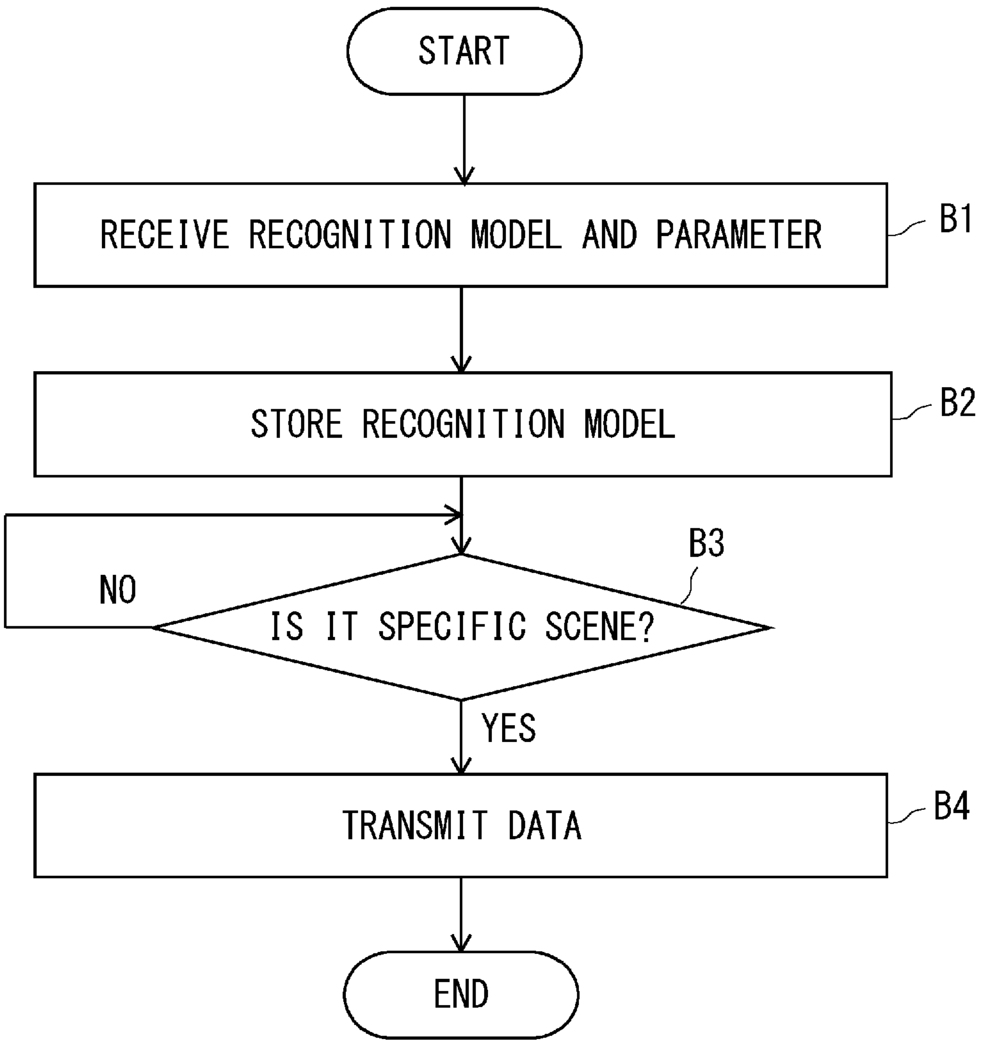
FIG. 6 is a flowchart illustrating an operation procedure in a vehicle.

FIG. 6 illustrates an operation procedure (information transmission method) in the vehicle 200. The scene recognition unit 204 (see FIG. 4) of the vehicle 200 receives the recognition model and the parameter sheet from the server 110 via the network 150 (step B1). The scene recognition unit 204 may receive the recognition model and the parameters while the vehicle is traveling.

The recognition model update unit 244 stores the recognition model received in step B1 in the recognition model storage unit 241 (step B2). In a case where a recognition model is already stored in the recognition model storage unit 241, the recognition model update unit 244 updates the recognition model stored in the recognition model storage unit 241 with the recognition model received in step B1.

The scene determination unit 242 acquires sensor information from the peripheral surveillance sensor 201 and the vehicle sensor 202 of the vehicle 200. The scene determination unit 242 applies the acquired sensor information to the recognition model, and determines whether or not the vehicle is in a situation corresponding to a specific scene (step B3). In a case where the vehicle is determined to be in a situation corresponding to a specific scene in step B3, the data transmission unit 243 transmits the data specified in the parameter sheet to the server 110 via the network 150 (step B4).

Returning to FIG. 5, the data collection unit 114 of the server 110 receives data transmitted from the vehicle 200 (step A4). The data collection unit 114 collects data from a plurality of vehicles 200 when they are determined to be in a situation corresponding to a specific scene. The data collection unit 114 outputs the collected data to the analysis apparatus 115 in association with, for example, the recognition model transmitted to the vehicle 200. The analysis apparatus 115 accumulates data received from the vehicle 200, for example, for each scene recognized using the recognition model. The analysis apparatus 115 analyzes the accumulated data.

In the present example embodiment, the server 110 transmits the recognition model and the parameters to the vehicle 200. The vehicle 200 determines whether or not the vehicle is in a situation corresponding to a specific scene on the basis of the received recognition model and the sensor information.

In a case where the vehicle 200 is determined to be in a situation corresponding to a specific scene, the vehicle transmits information specified in the parameter to the server 110. In the present disclosure, the server 110 can specify the scene for causing the vehicle 200 to transmit information and the information to be transmitted through the recognition model and the parameters to be transmitted to the vehicle 200. Accordingly, in a case where the vehicle 200 is in a situation corresponding to a specific scene, the server 110 can collect data desired to be collected.

In the present example embodiment, the server 110 can select a recognition model and a parameter according to the data desired to be acquired. If the server 110 acquires all the data from the vehicle 200, the server 110 needs to receive a large amount of data from a large number of vehicles 200 and process the large amount of data. In the present example embodiment, the server 110 can designate the situation in which data is transmitted and the data to be acquired using the recognition model and the parameter. Therefore, in the present example embodiment, the data collected from the vehicle 200 can be narrowed down, and the storage cost in the server 110 can be suppressed. Furthermore, in the present example embodiment, the amount of data transferred between the server 110 and the vehicle 200 can be reduced to suppress the communication cost.

Figure 7:
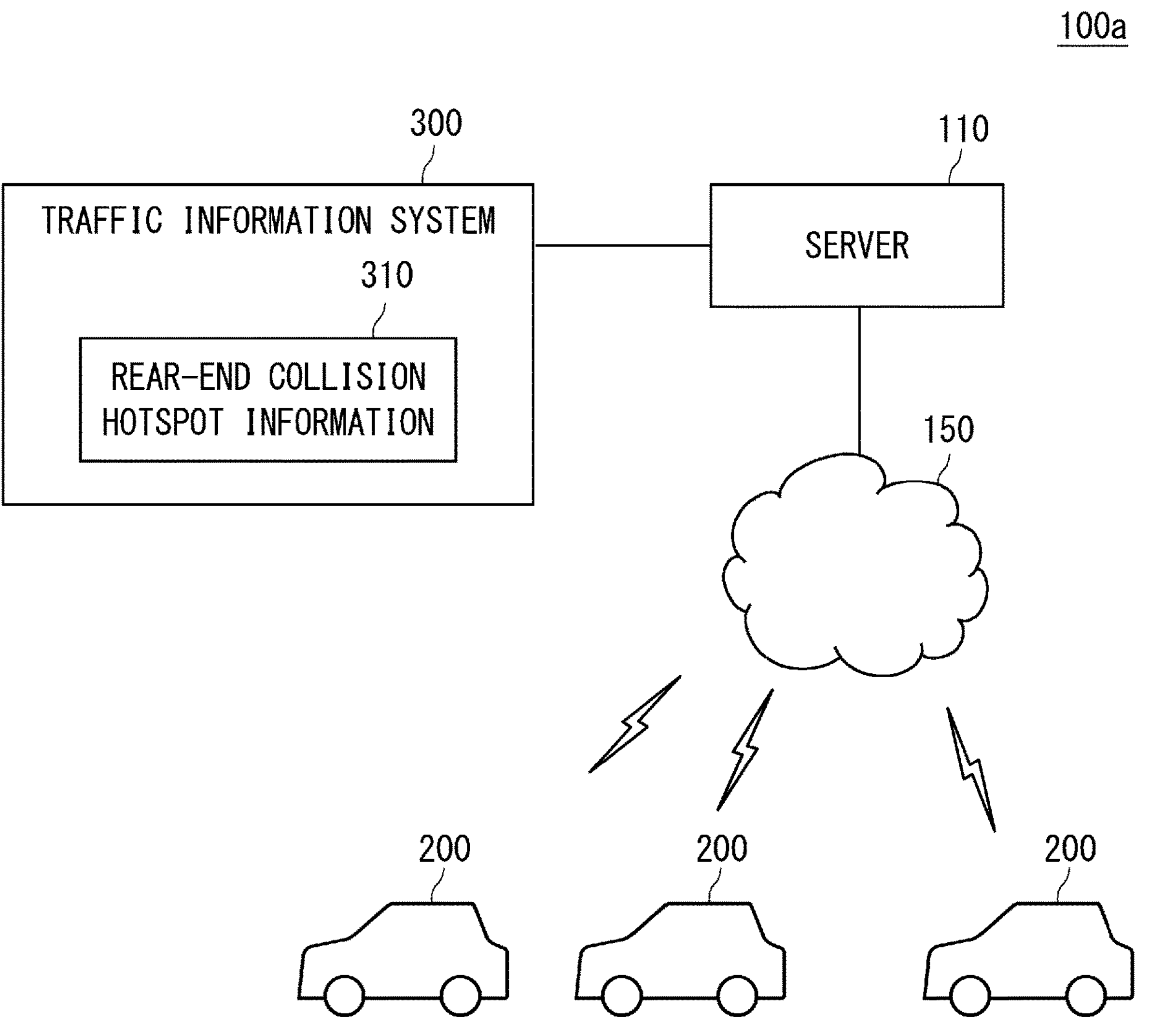
FIG. 7 is a block diagram illustrating a data collection system according to a second example embodiment of the present disclosure.

Next, a second example embodiment of the present disclosure will be described. FIG. 7 illustrates a data collection system according to the second example embodiment of the present disclosure. The data collection system 100*a* according to the present example embodiment is different from the data collection system 100 according to the first example embodiment illustrated in FIG. 2 in further including a traffic information system 300. In the present embodiment, the configuration of the server 110 may be similar to the configuration of the server 110 in the first example embodiment illustrated in FIG. 3. In addition, the configuration of the vehicle 200 may be similar to the configuration of the vehicle 200 in the first example embodiment illustrated in FIG. 4.

The traffic information system 300 is a system that provides regional characteristic information on traffic. The traffic information system 300 holds information in which a specific event related to traffic is associated with the point where the event frequently occurs. The traffic information system 300 holds, for example, rear-end collision hotspot information 310 including information indicating the point where rear-end accidents frequently occur. The traffic information system 300 may further hold, for example, information indicating a point where tailgating frequently occurs. The traffic information system 300 provides the server 110 with the rear-end collision hotspot information 310 that it holds.

The recognition model selection unit 111 of the server 110 refers to information held by the traffic information system 300 and selects a recognition model. The recognition model selection unit 111 refers to, for example, the rear-end collision hotspot information 310, and determines whether or not the vehicle 200 is located at a point where rear-end accidents frequently occur. In a case where the server 110 determines that rear-end accidents frequently occur near the current location of the vehicle 200, it selects a recognition model for identifying a scene of a rear-end collision as a recognition model to be transmitted to the vehicle 200.

In the present example embodiment, the server 110 cooperates with the traffic information system 300 to select a recognition model using information held by the traffic information system 300. By selecting a recognition model using, for example, the rear-end collision hotspot information 310, the server 110 can transmit a recognition model for identifying the scene of a rear-end collision to the vehicle 200 when there are many rear-end collisions near the current location of the vehicle 200. As described above, in the present example embodiment, a recognition model for discriminating events such as accidents that frequently occur near the current location of the vehicle 200 can be arranged in the vehicle 200. Other effects are similar to those described in the first example embodiment.

In each of the above example embodiments, the parameter sheet may include information indicating the priority of the data. The priority includes, for example, "high", "medium", and "low". The data transmission unit 243 (see FIG. 4) may monitor the communication bandwidth in the network 150 (see FIG. 2) and transmit data with high priority to the server 110 with priority depending on the communication bandwidth. For example, in a case where the communication bandwidth is greater than the first threshold, the data transmission unit 243 transmits data of all priorities to the server 110. In a case where the communication bandwidth is equal to or less than the first threshold, the data transmission unit 243 may transmit data with priority set to "high" or "medium" to the server 110 and discard data with priority set to "low". In a case where the communication bandwidth is equal to or less than the second threshold, which is less than the first threshold, the data transmission unit 243 may transmit data with priority set to "high" or "medium" to the server 110 and discard data with priority set to "low". The parameter sheet may include information specifying data to be always transmitted to the server 110 regardless of the determination result of the scene determination unit 242.

In each of the above example embodiments, the data transmission unit 243 may determine important data in the analysis on the basis of the purpose or scene of the analysis executed in the analysis apparatus 115 (see FIG. 3), and discard unimportant data. For example, in a case where the scene determination unit 242 determines a following scene, there is little information acquired from the video image data. In a case where sensor data is sufficient for analysis, the data transmission unit 243 may discard the video image data on the vehicle side without transmitting it to the server 110.

Figure 8:
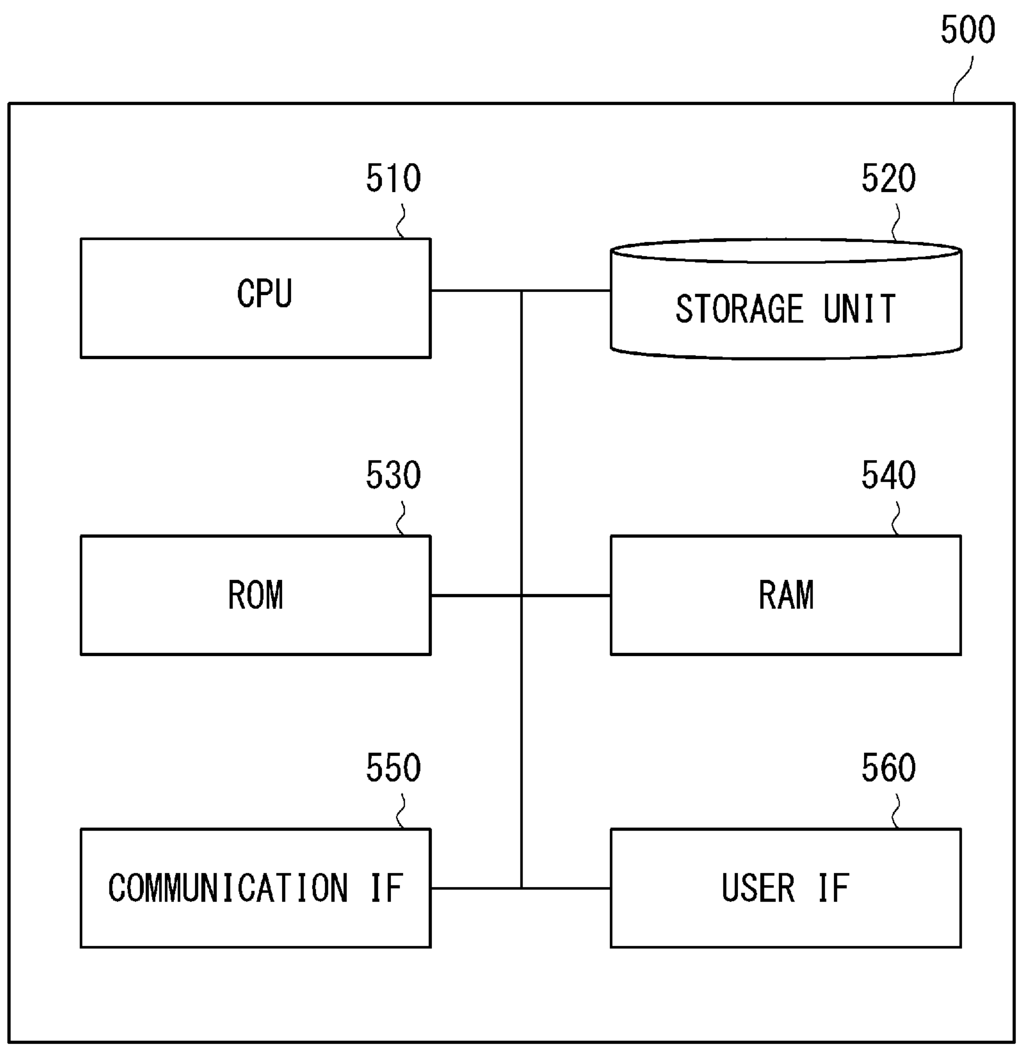
FIG. 8 is a block diagram illustrating an example of a configuration of a computer apparatus.

Next, the physical configuration will be described. In the present disclosure, the server 110 can be configured as a computer apparatus. FIG. 8 illustrates an example of a configuration of a computer apparatus that can be used as the server 110. A computer apparatus 500 includes a control unit (a central processing unit (CPU)) 510, a storage unit 520, a read only memory (ROM) 530, a random access memory (RAM) 540, a communication interface (IF) 550, and a user interface 560.

The communication interface 550 is an interface for connecting the computer apparatus 500 to a communication network through wired communication means, wireless communication means, or the like. The user interface 560 includes, for example, a display unit such as a display. The user interface 560 also includes input units such as a keyboard, a mouse, and a touch panel.

The storage unit 520 is an auxiliary storage device that can hold various types of data. The storage unit 520 does not necessarily have to be a part of the computer apparatus 500, but may be an external storage device, or a cloud storage connected to the computer apparatus 500 via a network.

The ROM 530 is a non-volatile storage device. For example, a semiconductor storage device such as a flash memory having a relatively small capacity can be used for the ROM 530. Programs that are executed by the CPU 510 can be stored in the storage unit 520 or ROM 530. The storage unit 520 or ROM 530 stores, for example, various programs for realizing the function of each unit in the server 110.

The RAM 540 is a volatile storage device. As the RAM 540, various types of semiconductor memory apparatuses such as a DRAM (Dynamic Random Access Memory) or an SRAM (Static Random Access Memory) can be used. The RAM 540 can be used as an internal buffer for temporarily storing data and the like. The CPU 510 loads a program stored in the storage unit 520 or the ROM 530 in the RAM 540, and executes the loaded program. The function of each unit in the server 110 can be realized by the CPU 510 executing the programs. The CPU 510 may include an internal buffer in which data and the like can be temporarily stored.

Figure 9:
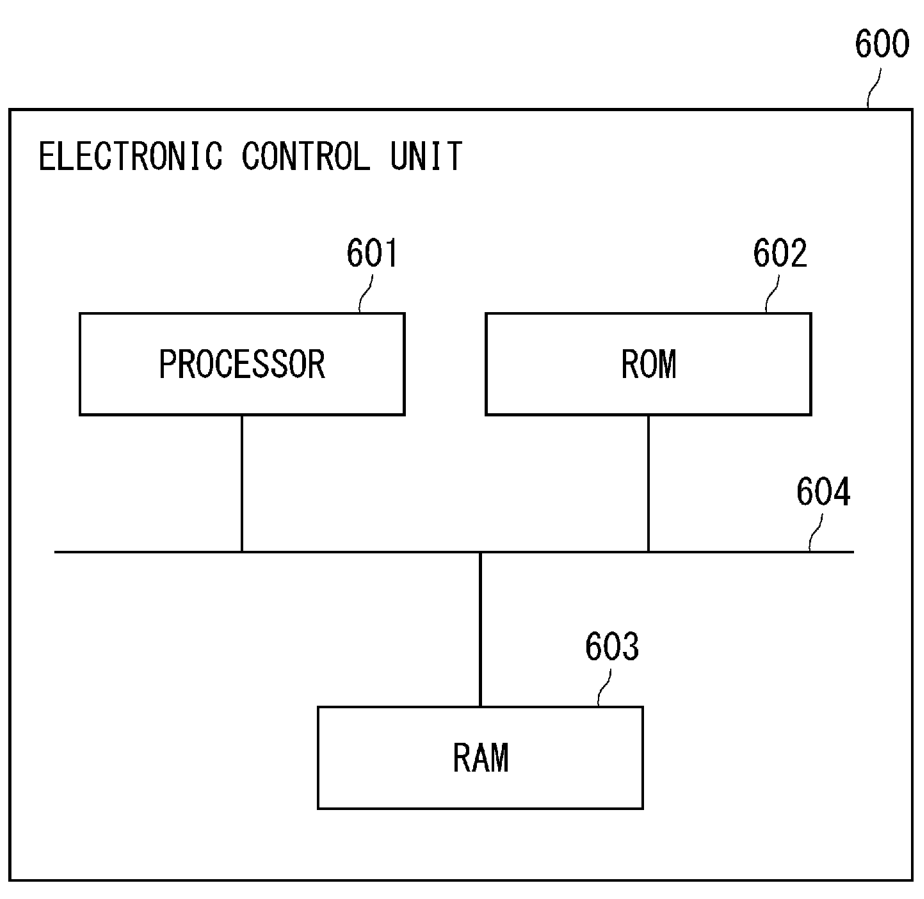
FIG. 9 is a block diagram illustrating a hardware configuration of an electronic control apparatus.

Furthermore, in the present disclosure, the scene recognition unit 204 (see FIG. 4) can be configured as an electronic control unit (electronic control apparatus). FIG. 9 illustrates an example hardware configuration of an electronic control apparatus that can be used for the scene recognition unit 204. The electronic control apparatus 600 includes a processor 601, a ROM 602, and a RAM 603. In the electronic control apparatus 600, the processor 601, the ROM 602, and the RAM 603 are interconnected via a bus 604. The electronic control apparatus 600 may include another circuit such as a peripheral circuit, a communication circuit, and an interface circuit, although illustration thereof is omitted.

The ROM 602 is a non-volatile storage device. For example, a semiconductor storage device such as a flash memory having a relatively small capacity is used for the ROM 602. The ROM 602 stores programs executed by a processor 501. The RAM 603 is a volatile storage device. Various semiconductor memory devices such as DRAM or SRAM are used for the RAM 603. The RAM 640 can be used as an internal buffer for temporarily storing data and the like.

The processor 601 loads programs stored in the ROM 602 in the RAM 603, and executes them. The function of each unit in the scene recognition unit 204 can be realized by the CPU 601 executing the programs.

The aforementioned programs can be stored and supplied to the computer apparatus 500 or electronic control apparatus 600 using various types of non-transitory computer readable media. Non-transitory computer readable media include various types of tangible storage media. Examples of non-transitory computer readable media include magnetic storage media such as floppy disks, magnetic tapes, and hard disk drives, optical magnetic storage media such as magneto-optical disks, optical disk media such as CD (Compact Disc) and DVD (Digital Versatile Disk), and semiconductor memories such as mask ROM, PROM (Programmable ROM), EPROM (Erasable PROM), flash ROM, and RAM. Further, the programs may be provided to computers using various types of transitory computer readable media. Examples of the transitory computer readable media include electric signals, optical signals, and electromagnetic waves. Transitory computer readable media can provide the program to a computer via a wired communication line such as electric wires and optical fibers or a radio communication line.

Although example embodiments according to the present disclosure have been described above in detail, the present disclosure is not limited to the above-described example embodiments, and the present disclosure also includes those that are obtained by making changes or modifications to the above-described example embodiments without departing from the spirit of the present disclosure.

The whole or part of the example embodiments disclosed above can be described as, but not limited to, the following supplementary notes.

[Supplementary Note 1]

An information collection system including:

a server; and a vehicle connected to the server via a network, the server including:

a recognition model selection means for selecting a recognition model for identifying that the vehicle is in a situation corresponding to a specific scene on the basis of sensor information;

a transmission means for transmitting the recognition model to the vehicle; and a data collection means for collecting information transmitted from the vehicle, the vehicle including:

a scene determination means for determining whether or not the vehicle is in a situation corresponding to a specific scene on the basis of the recognition model received from the server and sensor information; and a data transmission means for transmitting information to the server in a case where the vehicle is determined to be in a situation corresponding to a specific scene.

[Supplementary Note 2]

The information collection system according to Supplementary note 1, in which the server further includes a parameter determination means for determining a parameter that specifies information to be acquired from the vehicle on the basis of the selected recognition model, the transmission means further transmits the determined parameter to the vehicle, and the data transmission means transmits information specified in the parameter received from the server to the server in a case where the vehicle is determined to be in a situation corresponding to a specific scene.

[Supplementary Note 3]

The information collection system according to Supplementary note 1 or 2, in which the recognition model selection means selects a recognition model to be transmitted to the vehicle on the basis of position information of the vehicle.

[Supplementary Note 4]

The information collection system according to Supplementary note 3, in which the recognition model selection means acquires information indicating a specific scene associated with the position of the vehicle from regional characteristic information in which a geographical position and the specific scene are associated with each other, and selects a recognition model for identifying the specific scene indicated by the acquired information as a recognition model to be transmitted to the vehicle.

[Supplementary Note 5]

The information collection system according to any one of Supplementary notes 1 to 4, in which the recognition model selection means selects the recognition model according to the type of the road on which the vehicle is traveling.

[Supplementary Note 6]

The information collection system according to any one of Supplementary notes 1 to 5, in which the sensor information includes at least one of information acquired using a camera, information acquired using a speed sensor, or information acquired using an acceleration sensor installed in the vehicle.

[Supplementary Note 7]

The information collection system according to any one of Supplementary notes 1 to 6, in which the recognition model includes a convolutional neural network (CNN).

[Supplementary Note 8]

The information collection system according to any one of Supplementary notes 1 to 7, in which the vehicle further includes a recognition model update means for receiving the recognition model from the server and updating a recognition model to be used by the scene determination means with the received recognition model.

[Supplementary Note 9]

The information collection system according to any one of Supplementary notes 1 to 8, in which the server further includes an analysis apparatus configured to execute analysis using the information collected by the data collection means.

[Supplementary Note 10]

A server including:

a recognition model selection means for selecting a recognition model for identifying that a vehicle is in a situation corresponding to a specific scene on the basis of sensor information;

a transmission means for transmitting the recognition model to the vehicle via a network; and a data collection means for collecting information from the vehicle in a case where the vehicle is determined to be in a situation corresponding to a specific scene on the basis of the recognition model and sensor information in the vehicle.

[Supplementary Note 11]

The server according to Supplementary note 10, further including a parameter determination means for determining, on the basis of the selected recognition model, a parameter that specifies information to be transmitted to the vehicle in a case where the vehicle is determined to be in a situation corresponding to a specific scene in the vehicle.

[Supplementary Note 12]

The server according to Supplementary note 10 or 11, in which the recognition model selection means selects a recognition model to be transmitted to the vehicle on the basis of position information of the vehicle.

[Supplementary Note 13]

The server according to Supplementary note 12, in which the recognition model selection means acquires information indicating a specific scene associated with the position of the vehicle from regional characteristic information in which a geographical position and the specific scene are associated with each other, and selects a recognition model for identifying the specific scene indicated by the acquired information as a recognition model to be transmitted to the vehicle.

[Supplementary Note 14]

The server according to any one of Supplementary notes 10 to 13, in which the recognition model selection means selects the recognition model according to the type of the road on which the vehicle is traveling.

[Supplementary Note 15]

The server according to any one of Supplementary notes 10 to 14, further including an analysis apparatus configured to execute analysis using the information collected by the data collection means.

[Supplementary Note 16]

A vehicle including:

a scene determination means for determining whether or not the vehicle is in a situation corresponding to a specific scene on the basis of a recognition model for identifying that the vehicle is in a situation corresponding to a specific scene on the basis of sensor information received from a server via a network, and sensor information; and a data transmission means for transmitting information to the server via a network in a case where the vehicle is determined to be in a situation corresponding to a specific scene.

[Supplementary Note 17]

The vehicle according to Supplementary note 16, in which, in a case where the vehicle is determined to be in a situation corresponding to a specific scene, the data transmission means transmits to the server the information specified in a parameter received from the server that specify the information to be transmitted to the server.

[Supplementary Note 18]

The vehicle according to Supplementary note 16 or 17, in which the sensor information includes at least one of information acquired using a camera, information acquired using a speed sensor, or information acquired using an acceleration sensor installed in the vehicle.

[Supplementary Note 19]

The vehicle according to any one of Supplementary notes 16 to 18, in which the vehicle further includes a recognition model update means for receiving the recognition model from the server and updating a recognition model to be used by the scene determination means with the received recognition model.

[Supplementary Note 20]

An information collection method including:

selecting a recognition model for identifying that a vehicle is in a situation corresponding to a specific scene on the basis of sensor information;

transmitting the recognition model to the vehicle via a network; and collecting information from the vehicle in a case where the vehicle is determined to be in a situation corresponding to a specific scene on the basis of the recognition model and sensor information in the vehicle.

[Supplementary Note 21]

An information transmission method including:

determining whether or not the vehicle is in a situation corresponding to a specific scene on the basis of a recognition model for identifying that the vehicle is in a situation corresponding to a specific scene on the basis of sensor information, which has been received from a server via a network, and sensor information; and transmitting information to the server via a network in a case where the vehicle is determined to be in a situation corresponding to a specific scene.

[Supplementary Note 22]

A non-transitory computer readable medium storing a program to cause a computer execute:

selecting a recognition model for identifying that a vehicle is in a situation corresponding to a specific scene on the basis of sensor information;

transmitting the recognition model to the vehicle via a network; and collecting information from the vehicle in a case where the vehicle is determined to be in a situation corresponding to a specific scene on the basis of the recognition model and sensor information in the vehicle.

[Supplementary Note 23]

A non-transitory computer readable medium storing a program to cause a processor to execute:

determining whether or not a vehicle is in a situation corresponding to a specific scene on the basis of a recognition model for identifying that the vehicle is in a situation corresponding to a specific scene on the basis of sensor information, which has been received from a server via a network, and sensor information; and transmitting information to the server via a network in a case where the vehicle is determined to be in a situation corresponding to a specific scene.

REFERENCE SIGNS LIST

10 INFORMATION COLLECTION SYSTEM
20 SERVER
21 RECOGNITION MODEL SELECTION MEANS
22 TRANSMISSION MEANS
23 DATA COLLECTION MEANS
30 VEHICLE
31 SCENE DETERMINATION MEANS
32 DATA TRANSMISSION MEANS
100 DATA COLLECTION SYSTEM
110 SERVER
111 RECOGNITION MODEL SELECTION UNIT
112 PARAMETER DETERMINATION UNIT
113 TRANSMISSION UNIT
114 DATA COLLECTION UNIT
115 ANALYSIS APPARATUS
150 NETWORK
200 VEHICLE
201 PERIPHERAL SURVEILLANCE SENSOR
202 VEHICLE SENSOR
203 VEHICLE CONTROL ECU
204 SCENE RECOGNITION UNIT
205 COMMUNICATION APPARATUS
241 RECOGNITION MODEL STORAGE UNIT
242 SCENE DETERMINATION UNIT
243 DATA TRANSMISSION UNIT
244 RECOGNITION MODEL UPDATE UNIT
300 TRAFFIC INFORMATION SYSTEM
310 REAR-END COLLISION HOTSPOT INFORMATION

What is claimed is:

1. An information collection system comprising:

a server; and a vehicle connected to the server via a network, wherein the server comprises:

a first memory storing first instructions; and a first processor configured to execute the first instructions to:

select, on a basis of regional characteristic information in which a geographical position and a specific scene are associated with each other, a recognition model from a plurality of recognition models for identifying that the vehicle is in a situation corresponding to the specific scene on a basis of sensor information, the geographical position indicating sections separated by a mesh-like pattern at predetermined distances, each of the plurality of recognition models identifying a different scene;

transmit the recognition model to the vehicle; and collect information transmitted from the vehicle, the vehicle comprising:

a second memory storing second instructions; and a second processor configured to execute the second instructions to:

determine whether or not the vehicle is in the situation corresponding to the specific scene on a basis of the recognition model received from the server and the sensor information; and transmit information to the server in a case where the vehicle is determined to be in the situation corresponding to the specific scene.

2. The information collection system according to claim 1, wherein the first processor is further configured to execute the first instructions to determine a parameter that specifies information to be acquired from the vehicle on a basis of the selected recognition model, the first processor is further configured to execute the first instructions to transmit the determined parameter to the vehicle, and the second processor is configured to execute the second instructions to transmit information specified in the parameter received from the server to the server in a case where the vehicle is determined to be in the situation corresponding to the specific scene.

3. The information collection system according to claim 1, wherein the first processor is configured to execute the first instructions to acquire information indicating the specific scene associated with a position of the vehicle from the regional characteristic information, and select a recognition model for identifying the specific scene indicated by the acquired information as a recognition model to be transmitted to the vehicle.

4. The information collection system according to claim 1, wherein the first processor is configured to execute the first instructions to select the recognition model according to a type of a road on which the vehicle is traveling.

5. The information collection system according to claim 1, wherein the sensor information includes at least one of information acquired using a camera, information acquired using a speed sensor, or information acquired using an acceleration sensor installed in the vehicle.

6. The information collection system according to claim 1, wherein the recognition model includes a convolutional neural network (CNN).

7. The information collection system according to claim 1, wherein the second processor is further configured to execute the second instructions to receive the recognition model from the server and update a recognition model to be used with the received recognition model.

8. The information collection system according to claim 1, wherein the first processor is further configured to execute the first instructions to execute analysis using the collected information.

9. A server comprising:

a memory storing instructions; and a processor configured to execute the instructions to:

select, on a basis of regional characteristic information in which a geographical position and a specific scene are associated with each other, a recognition model from a plurality of recognition models for identifying that a vehicle is in a situation corresponding to the specific scene on a basis of sensor information, the geographical position indicating sections separated by a mesh-like pattern at predetermined distances, each of the plurality of recognition models identifying a different scene;

transmit the recognition model to the vehicle via a network; and collect information from the vehicle in a case where the vehicle is determined to be in the situation corresponding to the specific scene on a basis of the recognition model and the sensor information in the vehicle.

10. The server according to claim 9, the processor is further configured to execute the instructions to determine, on a basis of the selected recognition model, a parameter that specifies information to be transmitted to the vehicle in a case where the vehicle is determined to be in the situation corresponding to the specific scene in the vehicle.

11. The server according to claim 9, wherein the processor is configured to execute the instructions to acquire information indicating the specific scene associated with a position of the vehicle from the regional characteristic information, and select a recognition model for identifying the specific scene indicated by the acquired information as a recognition model to be transmitted to the vehicle.

12. The server according to claim 9, wherein the processor is configured to execute the instructions to select the recognition model according to a type of a road on which the vehicle is traveling.

13. The server according to claim 9, the processor is further configured to execute the instructions to execute analysis using the collected information.

14. An information collection method comprising:

selecting, on a basis of regional characteristic information in which a geographical position and a specific scene are associated with each other, a recognition model from a plurality of recognition models for identifying that the vehicle is in a situation corresponding to the specific scene on a basis of sensor information, the geographical position indicating sections separated by a mesh-like pattern at predetermined distances, each of the plurality of recognition models identifying a different scene;

transmitting the recognition model to the vehicle via a network; and collecting information from the vehicle in a case where the vehicle is determined to be in the situation corresponding to the specific scene on a basis of the recognition model and the sensor information in the vehicle.

15. The information collection system according to claim 1, wherein the plurality of recognition models include at least one of a recognition model for determining the specific scene of a tailgating, a recognition model for determining the specific scene of ignoring a traffic light, and a recognition model for determining the scene of drowsy driving.

16. The server according to claim 9, wherein the plurality of recognition models include at least one of a recognition model for determining the specific scene of a tailgating, a recognition model for determining the specific scene of ignoring a traffic light, and a recognition model for determining the scene of drowsy driving.

17. The information collection method to claim 14, wherein the plurality of recognition models include at least one of a recognition model for determining the specific scene of a tailgating, a recognition model for determining the specific scene of ignoring a traffic light, and a recognition model for determining the scene of drowsy driving.

* * * * *